(12) United States Patent
Glassman et al.

(10) Patent No.: US 6,453,305 B1
(45) Date of Patent: Sep. 17, 2002

(54) METHOD AND SYSTEM FOR ENFORCING LICENSES ON AN OPEN NETWORK

(75) Inventors: Steven C. Glassman, Mountain View; Mark S. Manasse, San Francisco, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/316,717

(22) Filed: May 21, 1999

(51) Int. Cl.[7] ............................................. G06F 17/60
(52) U.S. Cl. .............................. 705/59; 705/57; 705/51; 713/201
(58) Field of Search ................... 705/50–59; 713/201; 380/201

(56) References Cited

U.S. PATENT DOCUMENTS

| | | | | |
|---|---|---|---|---|
| 4,924,378 A | * | 5/1990 | Hershey et al. | 364/200 |
| 5,339,361 A | | 8/1994 | Schwalm et al. | 380/23 |
| 5,390,297 A | * | 2/1995 | Barber et al. | 395/200 |
| 5,553,143 A | * | 9/1996 | Ross et al. | 380/25 |
| 5,671,412 A | * | 9/1997 | Christiano | 395/615 |
| 5,745,879 A | * | 4/1998 | Wyman | 705/1 |
| 5,802,497 A | | 9/1998 | Manasse | 705/27 |
| 5,903,650 A | * | 5/1999 | Ross et al. | 380/25 |
| 5,905,860 A | | 5/1999 | Olsen et al. | |
| 5,917,168 A | | 6/1999 | Nakamura et al. | 235/379 |
| 5,930,777 A | | 7/1999 | Barber | 705/40 |
| 5,987,438 A | | 11/1999 | Nakano et al. | 705/41 |
| 6,029,150 A | | 2/2000 | Kravitz | 705/39 |
| 6,039,250 A | | 3/2000 | Ito et al. | 235/380 |
| 6,055,529 A | * | 4/2000 | Furlani | 707/3 |
| 6,056,786 A | * | 5/2000 | Rivera et al. | 795/712 |
| 6,073,124 A | * | 6/2000 | Krishnan et al. | 705/59 |
| 6,105,864 A | | 8/2000 | Shiobara et al. | 235/379 |
| 6,189,146 B1 | * | 2/2001 | Misra et al. | 717/11 |
| 2001/0011253 A1 | * | 8/2001 | Coley et al. | 705/59 |

FOREIGN PATENT DOCUMENTS

| | | | | |
|---|---|---|---|---|
| EP | 0 848 343 A2 | 6/1998 | ............ | G06F/17/60 |
| GB | 2136503 A | 2/1998 | ............. | G06F/1/00 |
| WO | WO 98/58306 | 12/1998 | ............. | G06F/1/00 |

OTHER PUBLICATIONS

Waltz, Mitzi, "Net trafficking: The copyright rift: file servers and file sharing make illegal copying of software far easier, but program licenses lag behind current technology." Aug. 20, 1991, MacWeek, v5, n29, p18 (3).*

* cited by examiner

Primary Examiner—James P. Trammell
Assistant Examiner—Jalatee Worjloh
(74) Attorney, Agent, or Firm—Fenwick & West LLP

(57) ABSTRACT

An electronic commerce system and method enforces a license agreement for content on an open network by restricting the number of consumers that can concurrently access the content. A consumer initially acquires vendor scrip, either from a broker or the vendor itself. The consumer presents the vendor scrip to the vendor along with a request to access the content. In response, the vendor gathers information about the consumer to determine whether the consumer belongs to the class allowed to access the content. The information may be gathered from the scrip or from other sources. If the consumer belongs to the class, then the vendor determines if a license to access the content is available. Generally, a license is available if the number of other consumers having licenses to access the content is less than the maximum specified in the license agreement. If no licenses are available, the vendor provides the consumer with an estimate of when a license will be available. If a license is available, the vendor directs the consumer to obtain license scrip which allows the consumer to access the content. The license scrip expires after a relatively brief period of time. When the consumer uses the license scrip to access the content, the vendor provides the consumer with new license scrip having a later expiration time.

16 Claims, 4 Drawing Sheets

| VENDOR 410 | VALUE 412 | SCRIP ID 414 | CUSTOMER ID 416 | EXPIRES 418 | PROPS 420 | STAMP 422 |

400

METHOD AND SYSTEM FOR ENFORCING LICENSES ON AN OPEN NETWORK

CROSS-REFERENCE TO RELATED APPLICATIONS

This application is related to U.S. Pat. No. 5,802,497, entitled METHOD AND APPARATUS FOR CONDUCTING COMPUTERIZED COMMERCE, which issued on Sep. 1, 1998 and is hereby incorporated by reference herein.

This application is also related to U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

This application is also related to U.S. patent application Ser. No. 09/273,240, entitled ENCRYPTING SECRETS IN A FILE FOR AN ELECTRONIC MICRO-COMMERCE SYSTEM, which was filed on Mar. 19, 1999, and is hereby incorporated by reference herein.

This application is also related to U.S. patent application Ser. No. 09/273,102, entitled ANONYMOUS PURCHASES WHILE ALLOWING VERIFIABLE IDENTITIES FOR REFUNDS RETURNED ALONG THE PATHS TAKEN TO MAKE THE PURCHASES, which was filed on Mar. 19, 1999, and is hereby incorporated by reference herein.

This application is also related to U.S. patent application Ser. No. 09/316,625 entitled DELEGATION OF PERMISSIONS IN AN ELECTRONIC COMMERCE SYSTEM, which was filed on the same day as the present application, and is hereby incorporated by reference herein.

BACKGROUND

1. Field of the Invention

This invention relates generally to an electronic commerce system and more particularly to a commerce system supporting restricted use of a resource, and even more particularly to a commerce system supporting N-user license agreements.

2. Background of the Invention

It is common for a library, corporation, or other organization to purchase content that will be made available to members of the organization. Often, the content is subject to a license restriction limiting distribution of the content. For example, a corporation may license or purchase a magazine and then distribute the magazine to interested employees. Typically, the corporation is restricted by the licensing agreement or copyright law from photocopying the magazine. Accordingly, the corporation must either obtain multiple copies of the magazine or circulate the single copy through the organization.

Similarly, the content licensed or purchased by the organization may be in electronic form. For example, the corporation may license a CD-ROM holding an electronic version of the magazine. While the CD-ROM can be loaded onto a server accessible to employees of the corporation via a computer network, the content may be restricted by an N-user license that forbids the corporation from allowing more than N users to simultaneously access the CD-ROM. To implement the restriction, software executing on the server tracks the number of people currently accessing the CD-ROM and blocks usage that exceeds the scope of the license.

In existing systems, the license control is performed by a combination of a specialized lock server and a client program. The lock server validates users' requests for access to the content and maintains the status of active users. The client program interacts with the lock server to acquire a lock and to provide access to the content.

There are many existing implementations of lock servers. However, they all are subject to one or more of the following undesirable restrictions:

- each content source has its own, separate, and proprietary lock server;
- the user's system already has the content protected from direct access and the client program gets the lock to access the content;
- acquiring a lock is a complicated action; and/or
- the set of valid users is limited.

For these reasons, existing lock servers are undesirable on an open network.

A lock server providing an N-user license on an open network should also support the following requirements:

- an unrestricted set of potential users;
- no single administrative domain covers all users;
- the users do not need to have a separate user application for each source of content;
- access to the content can be easily restricted; and
- the content exists on the server and not with the user.

Accordingly, there is a need for a way to provide restricted access to electronic content that works with a wide variety of possible access schemes. Preferably, the solution will allow enforcement of an N-user license for content located on an open network like the Internet.

SUMMARY OF THE INVENTION

The above needs are met by a method and system for electronic commerce that uses special scrip —called "license scrip"—to provide temporary licenses to consumers accessing content. Scrip is primarily used as a form of electronic currency, however it can be more generally considered as a one-time token representing a general value. When scrip is used as an electronic currency, its value is monetary. When scrip is used as a temporary license, its value is the permission to access specific content. This permission may be unlimited or it may be for only a relatively brief period of time, say a few minutes to a few hours.

Accessing content with license scrip is very much like buying regular content with monetary scrip. Instead of having a price specified in monetary terms. Each page of content has a price (which may be zero) given in terms of license scrip. A consumer obtains license scrip from the vendor, preferably exchanging regular vendor scrip for the license scrip.

The vendor uses the license scrip to enforce an N-user license agreement—granting up to N people simultaneous access to the content. The vendor tracks the number and identity of consumers currently having licenses to access the content (i.e., consumers currently possessing valid license scrip).

A consumer initially lacks the license scrip needed to access the content. Upon receiving an access request from the consumer, the vendor determines whether a-license is available. If a license is not available, the vendor tells the consumer to try again later and, optionally, provides the consumer with an estimate of when a license will be available.

If a license is available, then the vendor directs the consumer to obtain license scrip. Normally, the consumer obtains license scrip by requesting it from the vendor, but the consumer may get the license by any acceptable means. After receiving a license scrip request, the vendor verifies that the consumer belongs to a class entitled to have a license. For example, if licenses are available to residents of only a certain state, the vendor ensures that the consumer resides in the state before granting the consumer a license.

If a license is available, then the vendor provides the consumer with the license scrip and remembers the granted license. The license scrip is preferably set to expire after a brief time period, but the duration of the license may vary depending upon business or legal concerns. To access content covered by the license, the consumer provides the license scrip when requesting content from the vendor. Each time the consumer accesses the content, the vendor returns replacement license scrip having the same or a later expiration time. Accordingly, the consumer can access the content as long as their license remains valid. When the consumer has not accessed the content for a while, the license scrip expires and the consumer can no longer access the content without obtaining new license scrip.

DETAILED DESCRIPTION OF THE PREFERRED EMBODIMENTS

A preferred embodiment of the present invention restricts access to electronic content through the use of an electronic commerce system. Accordingly, it is useful to describe the electronic commerce system before detailing how the system is utilized according to the present invention.

Figure 1:
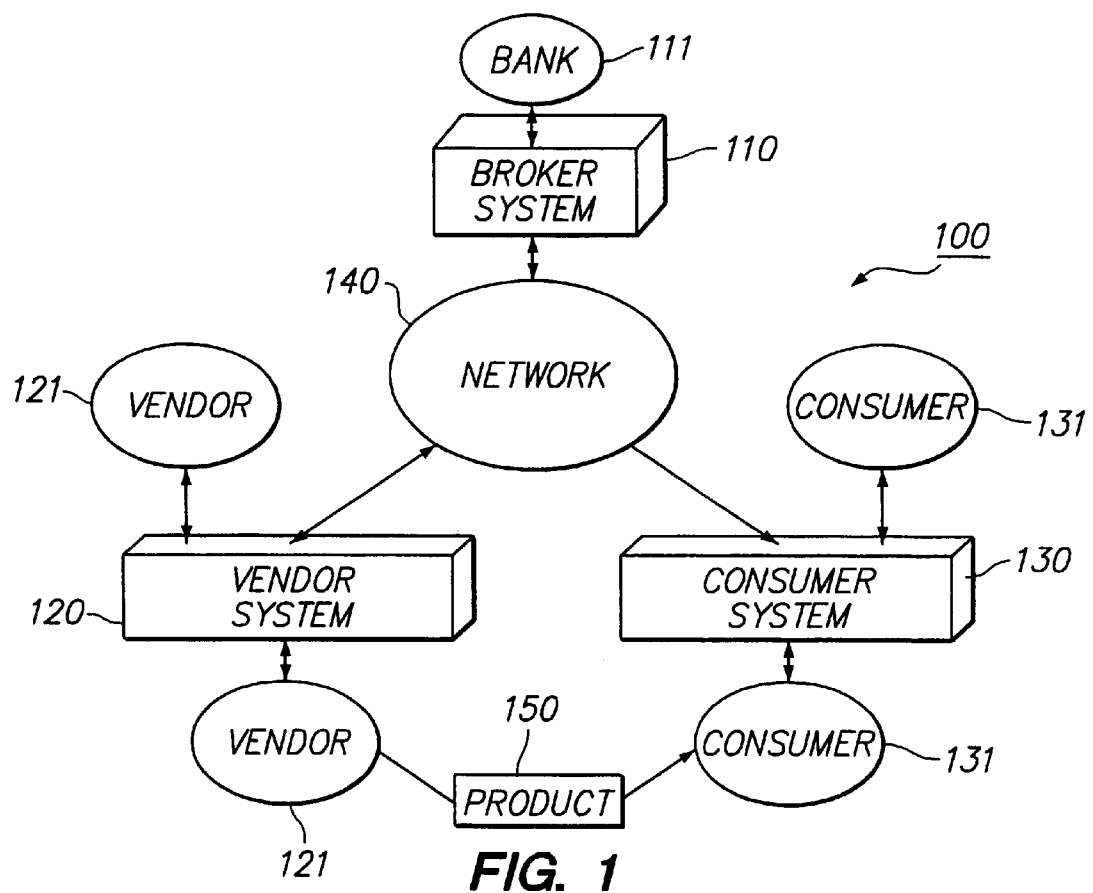
FIG. 1 is a top-level block diagram illustrating a computerized system for conducting electronic commerce.

FIG. 1 shows a computerized system 100 for conducting electronic commerce. The system 100 includes a broker system 110, a vendor system 120, and a consumer system 130 interconnected by a communications network 140.

For clarity, the system 100 depicted in FIG. 1 shows only single broker, vendor, and consumer systems. In actual practice, any number of broker, vendor, and consumer systems can be interconnected by the network 140. The network 140 can be public or private, such as, for example, the Internet, an organization's intranet, a switched telephone system, a satellite linked network, or another form of network. The broker 111 using the broker system 110 can be a bank, a credit provider, an Internet service provider, a telephone company, or any institution the consumer trusts to sell electronic currency called "scrip."

The vendor system 120 is operated by a vendor 121 The vendor 121 provides products and/or content 150 of any type to consumers and, in one embodiment, provides content which is available by subscription. Each subscription page (i.e., page of data that is available for "purchase") has a price of zero but requires a special type of scrip, called "subscription scrip," before it can be accessed. Since the price of a page is zero, the consumer 131 can "purchase" an unlimited number of pages once the consumer 131 has the proper subscription scrip 330. The subscription expires when the subscription scrip 330 expires.

A consumer 131 can use the consumer computer system 130 to electronically acquire the products or content 150 of the vendor 121. As used herein, "consumer" refers to an organization such as a library or corporation, a member of the organization, such as a librarian or an employee, or an individual, such as a person visiting a library or a home computer user. Of course, actions attributed to the organization are usually performed by a member of the organization.

Figure 2:
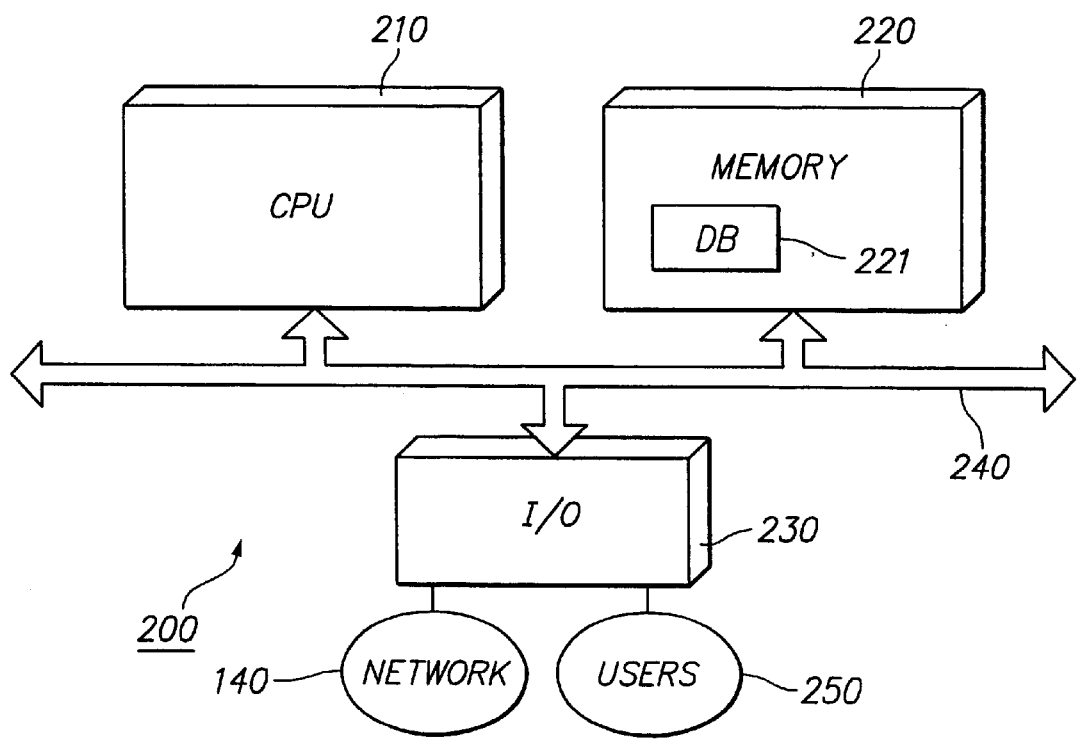
FIG. 2 is a block diagram illustrating a computer system used in the system of FIG. 1.

A computer system 200 suitable for use as the broker, vendor, and consumer systems is shown in FIG. 2. The computer system 200 includes a central processing unit (CPU) 210, a memory 220, and an input/output interface 230 connected to each other by a communications bus 240. The CPU 210, at the direction of users 250, e.g. brokers, vendors, and/or consumers, executes software programs, or modules, for manipulating data. The programs and data can be stored in the memory 220 as a database (DB) 221. The DB 221 storing programs and data on the consumer computer system 130 is referred to as a "wallet." In a preferred embodiment of the present invention described herein, many of the operations attributed to the consumer are, in fact, performed automatically by the wallet 221.

The memory 220 can include volatile semiconductor memory as well as persistent storage media, such as disks. The I/O interface 230 is for communicating data with the network 140, the users 250, and other computer system peripheral equipment, such as printers, tapes, etc.

The computer system 200 is scaled in size to function as the broker, vendor, or consumer systems. For example, when scaled as the consumer computer system 130, the computer system 200 can be a small personal computer (PC), fixed or portable. The configurations of the computer system 200 suitable for use by the broker 111 and the vendor 121 may include multiple processors and large database equipped with "fail-safe" features. The fail-safe features ensure that the database 221 is securely maintained for long periods of time.

Figure 3:
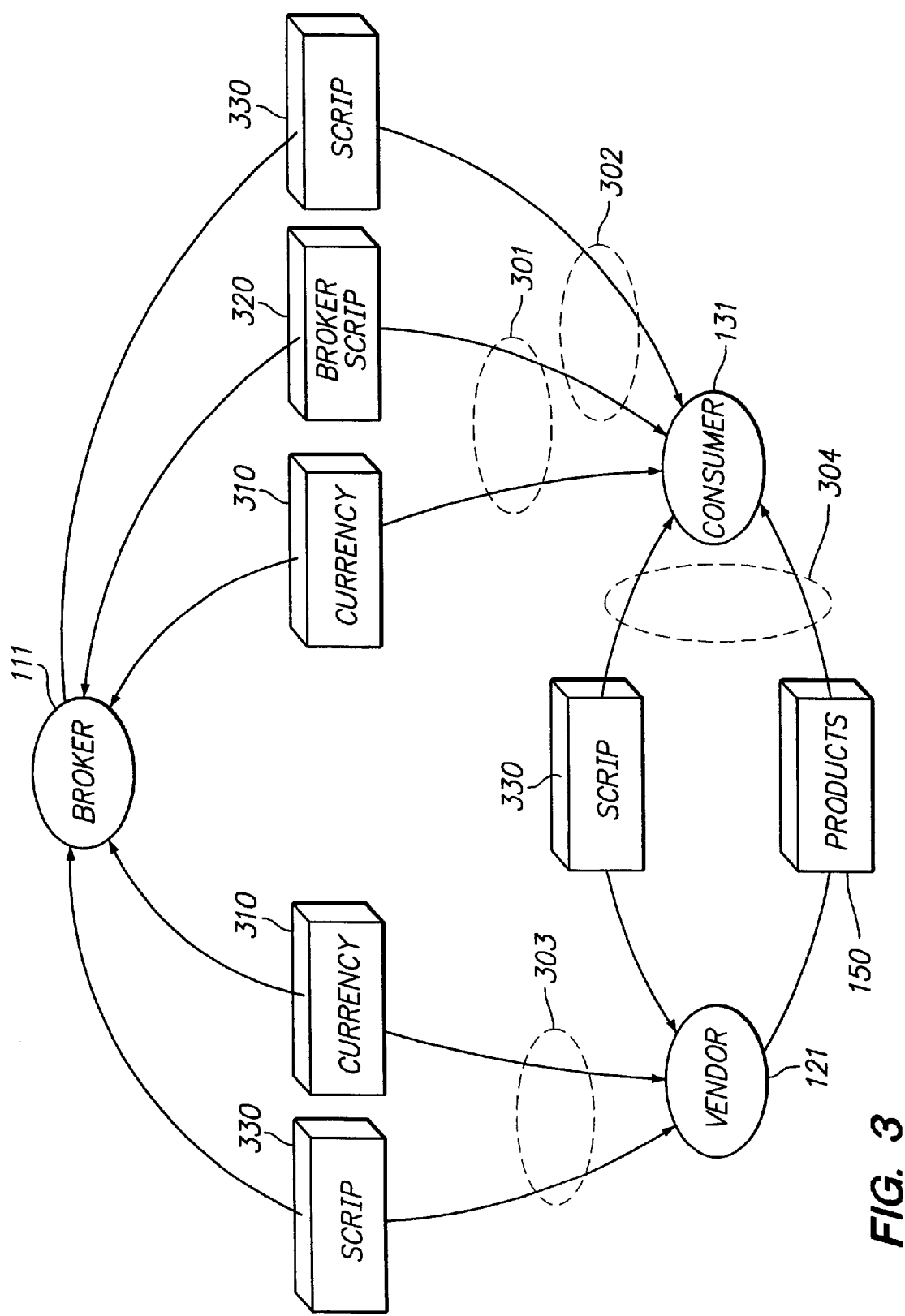
FIG. 3 is a flow diagram illustrating the operations of the system of FIG. 1.

FIG. 3 shows an operation of the electronic commerce system 100. The consumer 131 uses currency to purchase electronic broker scrip 320 generated by the broker 111. Here, purchasing means that upon a validation of the authenticity of the consumer 131 and the consumer's currency 310, the broker system 110 generates signals, in the form of data records. The signals are communicated, via the network 140, to the consumer system 130 for storage in the wallet 221 of the memory 220 of the consumer system 130.

The scrip is stamped by the generator of the scrip to carry information that is verifiable by the originator, and any other system that has an explicit agreement with the originator. In addition, each scrip is uniquely identifiable and valid at only a single recipient. After a single use, the recipient of the scrip can invalidate it, meaning that the signals of the data record are no longer accepted for processing by the recipient computer system.

In one embodiment, the consumer 131 exchanges the broker scrip 320 with the broker 111 for vendor scrip 330. To complete this transaction, the broker system 110 executes licensed software programs which generate scrip 330 for consumers as needed. Alternatively, the broker 111, in a similar transaction 303, exchanges currency 310 for bulk vendor scrip 330 which is then sold to consumers.

In another embodiment, the consumer 131 exchanges currency with the vendor 121 for regular vendor. In this latter embodiment, there is no need for a broker 111. In addition, the vendor scrip may be free, meaning that the consumer 131 does not need to exchange currency for the scrip.

The consumer 131, in a transaction 304, provides the scrip 330 to the vendor 121. The vendor 121 checks the stamp of the scrip 330 to verify its authenticity, and also checks to make sure the value of the scrip covers the requested content and has not expired. Approval of the transaction results in the delivery of the desired content 150 to the consumer 131. The vendor 121 can also return 304 modified scrip 330 to the consumer 131 as change.

Figures 4, 5:
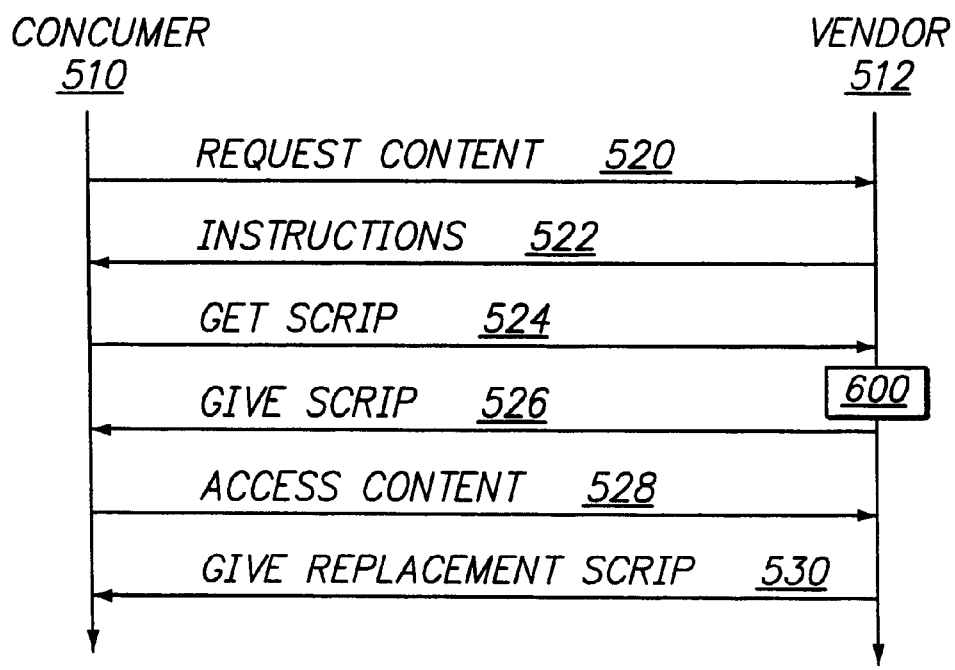
FIG. 4 is a block diagram illustrating the data fields of a piece of scrip used in the system of FIG. 1.
FIG. 5 is a diagram illustrating transactions between a consumer and a vendor utilizing license scrip to enforce an N-user license agreement according to the present invention.

FIG. 4 is a block diagram illustrating the data fields of a single piece of scrip 400. The scrip 400 is logically separated into seven data fields. The Vendor field 410 identifies the vendor for the scrip 400. The Value field 412 gives the value of the scrip 400. The scrip ID field 414 is the unique identifier of the scrip. The Customer ID field 416 is used by the broker 111 and vendor 121 to verify that the consumer has the right to spend the scrip. The Expires field 418 gives the expiration time for the scrip 400. The Props field 420 holds consumer properties, such as the consumer's age, state of residence, employer, etc. Finally, the Stamp field 422 holds a digital stamp and is used to detect tampering with the scrip 400.

The present invention uses "license" scrip, which can be thought of as special purpose scrip having a short period of validity. A consumer with license scrip has a license to view the content covered by the license until the scrip expires.

FIG. 5 is a diagram illustrating transactions between a consumer 510 and a vendor 512 utilizing license scrip to enforce an N-user license agreement according to the present invention. In the transactions of FIG. 5, the vendor 512, for example, can be a library located at a state university. Assume the library purchases a four user license for a CD-ROM and makes the CD-ROM available to other terminals in the library via a local area network and residents of the state via the Internet. To conform with the license, the library must ensure that no more than four consumers are simultaneously accessing the CD-ROM. In this example, the library is the vendor 512 and the people who can access the CD-ROM, either in the library or elsewhere, are the consumers 510.

In another example, a newspaper publisher operates a web site. Assume that a corporation purchases a 20 user license allowing up to 20 people from the corporation to simultaneously access content on the web site. To police its license, the publisher tracks the users of its web site and block users who are not licensed or who have exceeded the scope of the applicable license. Accordingly, the newspaper publisher is the vendor 512 and the corporation and its employees are the consumers 510.

Although neither the illustrated transactions nor the above examples directly utilize a broker, there may be circumstances where it is desirable to use a broker 111 to perform one or more of the transactions described below. Those of ordinary skill in the art will understand that certain transactions attributed to the consumer or the vendor can be performed instead by a broker 111. For example, the library and/or newspaper may issue vendor and license scrip directly or rely on a third-party broker for this task.

Turning to FIG. 5, the consumer 510 initially requests 520 content from the vendor 512 without valid license scrip. In response, the vendor 512 checks to determine whether there is an available license (i.e., whether an additional consumer is allowed to view the content under the license). Preferably, the vendor 512 maintains a data structure associated with the licensed content that can be quickly scanned to determine whether a license is available. In one embodiment, this data structure is a simple N-entry array, with each entry holding fields for the expiration time and Customer ID of the consumer 510 having the license. As licenses are granted, the vendor 512 fills in the array until no more entries are available.

If no licenses are available, then the vendor 512 instructs 522 the consumer 510 to try again later. In one embodiment, the vendor 512 scans the data structure to determine when the first license may become available and provides the consumer 510 with that time as a suggestion of when to try to access the content again. If a license is available, then the vendor 512 instructs the consumer 510 to go and obtain license scrip.

Figure 6:
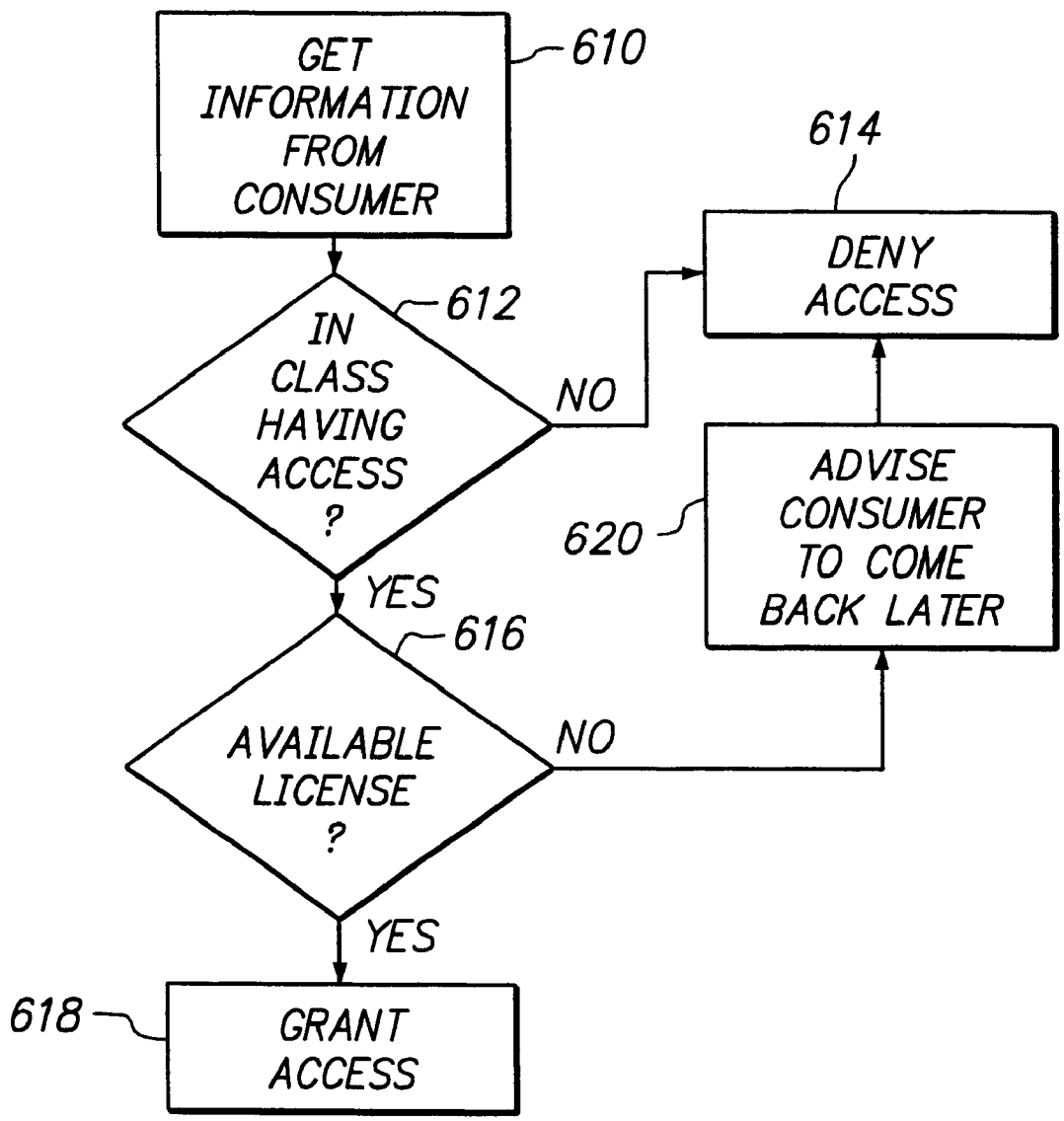
FIG. 6 is a flow chart illustrating steps for determining whether to grant a license to a consumer.

In response, the consumer 510 attempts 524 to obtain license scrip from the vendor 512. The vendor 512 determines whether the consumer 510 is entitled to a license (i.e., entitled to view the content). FIG. 6 is a flow chart 600 illustrating steps for determining whether to grant license scrip to the consumer 510. When the vendor 512 receives the request from the consumer 510, the vender retrieves 610 information about the consumer. The vendor 514 may retrieve this information by asking the consumer 510 to provide it, from the scrip used to request the license scrip, from a "cookie" on the consumer's computer system, or from a table of information shared by the vendor 512 and the consumer 510 or a broker 111. Additionally, the wallet 221 on the consumer's computer system 130 may be configured to automatically provide information about the consumer 510 when requested by a vendor 512. Depending on the needs of the vendor 512 and the license agreement for the content, the information that may be gathered in this manner includes whether the consumer 510 is a member of an organization, the state of residence of the consumer, the consumer's age, or any other information that is relevant to determining whether to provide access to the consumer 510.

The vendor 512 uses this information to determine 612 whether the consumer belongs to a class that has access to the content held by the vendor 512. If the consumer does not belong to a class having access, for example, if the consumer is not a state resident, then the vendor denies 614 access to the consumer 510. Preferably, the vendor 512 directs the consumer 510 to a web page explaining why access was denied.

If the consumer 510 belongs to a class having access, the vendor 512 scans the data structure identifying the current licensees of the content and determines 616 whether an additional license is available. Since there may be a delay between the time the consumer 510 is told to buy license scrip and when the wallet 221 tries to buy the scrip, it is possible that the available license may have been acquired by another consumer during that time. If no licenses are available, then the consumer 510 is told to try again later and optionally given a time when a license may be available.

If a license is available, then the vendor 512 grants 618 the license to the consumer 510. The vendor 512 provides 526 the consumer with license scrip that allows the consumer 510 to access the content. The license scrip preferably has a relatively short validity period, say a few minutes to an hour, and allows the consumer 510 full access to the licensed material for the duration of the scrip. The choice of expiration time for the scrip is a business or legal decision. Since the intention of the license scrip is to hold onto one license slot while the consumer 510 is actively using the content, the duration of the license should cover the time that the consumer 510 is expected to be active. In another embodiment, the duration of the scrip is determined, at least in part, by the type of content accessed by the consumer 510. In addition, the vendor 512 preferably records data about the granted license, including the Customer ID of the consumer 510 and the expiration time of the license in the appropriate data structure.

Each time the consumer 510 wishes to access 528 content held by the vendor 512, the consumer provides the license scrip to the vendor. If the scrip is expired or otherwise invalid, then the consumer's request for access is treated as a request without scrip as illustrated by transaction 520. If the scrip is valid, then the vendor 512 allows the consumer 510 to access the content. In addition, the vendor 512 provides 530 the consumer 510 with replacement license scrip having an updated expiration time. Typically, the updated expiration time is later than the old expiration time, although it can be the same or earlier. In one embodiment, the vendor 512 grants the consumer 510 less additional time each time the vendor issues new license scrip to ensure that the consumer's license eventually expires and other consumers may eventually access the content. The vendor 512 also updates its data structure to reflect the new expiration date of the consumer's license.

Periodically, the vendor 514 preferably scans the data structure to determine whether any licenses have expired. If so, the entry is purged from the data structure, thereby freeing up a license for another consumer 510. Accordingly, the present invention uses license scrip to enforce an N-user license agreement.

It should be understood that FIG. 5 illustrates only one possible set of transactions. FIG. 3, in combination with FIG. 5, provides insight into other possible transactions. For example, a corporation could purchase an N-user license agreement from a broker 111 to access content on a vendor's system 120. The broker 111 can verify that the corporation is entitled to a license and then issue the license scrip from a special scrip series corresponding to the number of users covered by the license. The vendor 121 knows from the scrip series to restrict access from consumers using that license scrip.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

We claim:

1. A method of restricting simultaneous access to content, comprising the steps of:
   receiving a request to access the content from a consumer;
   determining whether the consumer is entitled to access the content;
   responsive to a positive determination that the consumer is entitled to access the content, determining whether license scrip authorizing access to the content is available;
   responsive to a determination that license scrip is available, providing the license scrip to the consumer; and
   responsive to a determination that license scrip is not available, calculating an estimate of when the license scrip authorizing access will be available.

2. The method of claim 1, wherein the request to access the content is accompanied by license scrip having an expiration time and wherein the providing step provides the consumer with additional license scrip having an updated expiration time.

3. The method of claim 1, wherein the license scrip has an expiration time and further comprising the steps of:
   receiving a second request to access the content from the consumer, the second request including the license scrip; and
   responsive to the second request, providing the consumer with replacement license scrip having an updated expiration time.
   determining whether a license to access the content is available.

4. The method of claim 1, wherein the step of determining whether the consumer is entitled to access the content comprises the step of:
   determining whether the consumer belongs to a class having access to the content.

5. The method of claim 4, wherein the step of determining whether the consumer belongs to a class having access to the content comprises the step of:
   determining information about the consumer from scrip utilized to request access to the content.

6. The method of claim 1, wherein the step of determining whether license scrip authorizing access to the content is available comprises the steps of:
   determining a number of consumers that have licenses to access the content; and
   determining a number of allowed licenses;
   wherein license scrip authorizing access to the content is available if the number of consumers that have licenses to access the content is less than the number of allowed licenses.

7. A computer program product having computer-readable instructions embodied thereon for restricting access to content stored on a computer system, the computer-readable instructions comprising instructions for:
   receiving a request to access the content stored on the computer system, the request accompanied by scrip;
   determining whether the scrip authorizes access to the content;
   responsive to a determination that the scrip does not authorize access to the content, determining whether scrip authorizing access to the content is available;
   responsive to a determination that scrip authorizing access to the content is available, providing the scrip; and
   responsive to a determination that scrip authorizing access to the content is not available, calculating an estimate of when the scrip authorizing access will be available.

8. The computer program product of claim 7, further comprising instructions for:
   responsive to a determination that the scrip authorizes access to the content, providing replacement scrip having an updated expiration time.

9. The computer program product of claim 7, wherein the instructions for determining whether the scrip authorizes access to the content further comprise computer instructions for:
   determining a type of the scrip accompanying the request; and
   responsive to a determination that accompanying scrip is license scrip, determining whether the license scrip has expired, wherein unexpired license scrip authorizes access to the content.

10. The computer program product of claim 7, wherein the instructions for determining whether scrip authorizing access to the content is available comprise instructions for:
- determining a maximum number of requesters that can be authorized to access the content;
- determining whether a current number of requesters authorized to access the content is less than the maximum number of requesters; and
- responsive to a determination that the current number of requesters authorized to access the content is less than the maximum number of requesters, determining that scrip authorizing access to the content is available.

11. A computer system for limiting a number of users that can access content stored on a server associated with the computer system, the computer system comprising:
- a module for receiving a request from a user to access the content stored on the server;
- a module for determining the number of users currently having rights to access the content;
- a module for providing the user with license scrip if the number of users currently having rights to access the content is less than a number of users allowed to access the content, the license scrip granting the user the right to access the content; and
- a module for providing the user with an estimate of when the license scrip will be available if the number of users currently having rights to access the content is not less than the number of users allowed to access the content.

12. The system of claim 11, wherein the module for determining the number of users currently having access rights to content comprises:
- a module for scanning a data structure stored in a memory of the computer system, the data structure having one or more entries indicating the number of users having access rights to the content.

13. The computer system of claim 12, wherein the data structure indicates when users' rights to access the content expire, further comprising:
- a module for purging the entries of users whose right to access the content has expired.

14. The system of claim 11, wherein only a privileged class can access the content, further comprising:
- a module for determining whether the user is a member of the privileged class.

15. The system of claim 11, wherein the license scrip grants the user the right to access the content until an expiration time.

16. The system of claim 15, further comprising:
- a module for receiving a second request from the user to access the content stored on the server accompanied by the license scrip; and
- a module for providing the user with replacement license scrip having a later expiration time.

* * * * *